(12) United States Patent
Honda et al.

(10) Patent No.: US 8,543,145 B2
(45) Date of Patent: Sep. 24, 2013

(54) SHORT MESSAGE SERVICE MANAGEMENT SYSTEM, SHORT MESSAGE FORWARDING DEVICE, SHORT MESSAGE FORWARDING MANNER DEFINITION INFORMATION SUPPLY DEVICE, AND SHORT MESSAGE FORWARDING METHOD

(75) Inventors: Yasuyuki Honda, Yokohama (JP);
Shigeru Iwashina, Yokohama (JP);
Nobuo Takeuchi, Yokohama (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 12/999,986

(22) PCT Filed: Jun. 15, 2009

(86) PCT No.: PCT/JP2009/002702
§ 371 (c)(1),
(2), (4) Date: Dec. 17, 2010

(87) PCT Pub. No.: WO2009/153958
PCT Pub. Date: Dec. 23, 2009

(65) Prior Publication Data
US 2011/0098065 A1    Apr. 28, 2011

(30) Foreign Application Priority Data
Jun. 18, 2008 (JP) ................................ 2008-159207

(51) Int. Cl.
*H04W 4/00* (2009.01)
(52) U.S. Cl.
USPC .......................................... 455/466; 370/338
(58) Field of Classification Search
None
See application file for complete search history.

(56) References Cited

U.S. PATENT DOCUMENTS

| | | | |
|---|---|---|---|
| 7,269,431 B1 * | 9/2007 | Gilbert .......................... | 455/466 |
| 8,014,402 B2 | 9/2011 | Harris | |
| 8,121,626 B1 * | 2/2012 | Kirchhoff et al. ............. | 455/466 |
| 2004/0008723 A1 | 1/2004 | Uchida et al. | |
| 2007/0259657 A1 * | 11/2007 | Cheng ........................... | 455/419 |
| 2007/0274271 A1 * | 11/2007 | Jones et al. ................... | 370/338 |

(Continued)

FOREIGN PATENT DOCUMENTS

| JP | 10-207795 A | 8/1998 |
|---|---|---|
| JP | 2003-111140 A | 4/2003 |

(Continued)

OTHER PUBLICATIONS

PCT/JP2009/002702 PCT/IB/338.

(Continued)

*Primary Examiner* — Marcos Batista
*Assistant Examiner* — Frank Donado
(74) *Attorney, Agent, or Firm* — Crowell & Moring LLP (57) ABSTRACT

A short message with a destination of a single terminal device that has been defined by a user on the transmitting side, from among multiple terminal devices used by an identical user on the receiving side, is forwarded to and received by another predetermined terminal device that has been defined as a destination. Communication relay equipment included between multiple networks operated by network operators is provided with functions of temporarily storing a short message and storing information that defines a short message forwarding manner. In transmitting the short message, even if the original destination is not capable of receiving the message, the short message is transmitted to another destination based upon the information that defines the short message forwarding manner.

8 Claims, 8 Drawing Sheets

(56) References Cited

U.S. PATENT DOCUMENTS

| | | | |
|---|---|---|---|
| 2008/0101370 A1* | 5/2008 | Marsico et al. | 370/392 |
| 2008/0200192 A1* | 8/2008 | Harris | 455/466 |
| 2009/0103520 A1* | 4/2009 | Begall et al. | 370/352 |
| 2009/0170525 A1* | 7/2009 | Baghdasaryan | 455/456.1 |
| 2009/0325552 A1* | 12/2009 | Carpenter | 455/414.1 |

FOREIGN PATENT DOCUMENTS

| | | |
|---|---|---|
| JP | 2005-533413 A | 11/2005 |
| JP | 2006-238173 A | 9/2006 |
| JP | 2007-274524 A | 10/2007 |
| WO | WO 2008/052334 A1 | 5/2008 |

OTHER PUBLICATIONS

PCT/JP2009/002702 PCT/IB/373.
PCT/JP2009/002702 PCT/ISA/237 (Translation).
1. PCT/JP2009/002702 PCT/ISA/210.
Korean Office Action w/Translation, dated Feb. 22, 2012, 6 pages total.
Russian Office Action w/Translation, dated Apr. 25, 2012, 12 pages total.
Chinese Office Action w/Translation, dated Oct. 10, 2012, 11 pages total.
Chinese Office Action w/Translation, dated May 9, 2013, (Sixteen (16) pages).

* cited by examiner

SHORT MESSAGE SERVICE MANAGEMENT SYSTEM, SHORT MESSAGE FORWARDING DEVICE, SHORT MESSAGE FORWARDING MANNER DEFINITION INFORMATION SUPPLY DEVICE, AND SHORT MESSAGE FORWARDING METHOD

TECHNICAL FIELD

The present invention relates to a short message service management system, a short message forwarding device, a short message forwarding manner definition information supply device, and a short message forwarding method, whereby a short message transmitted from a user on the transmitting side who uses a short message service (Short Message Service: SMS) can be received by any terminal device selected from among multiple terminal devices or by all the terminal devices respectively located in networks operated by multiple network operators with which an identical user on the receiving side has made contracts.

BACKGROUND ART

There is a communication service of transmitting in store-and-forward system a message composed of characters from a transmitting side terminal device via one or more other networks or communication relay equipment of providers to a receiving side terminal device. Such a communication service has already been implemented in lots of countries as an embodiment in a known communication service called short message service, for example.

Meanwhile, an identical subscriber uses multiple terminal devices located in networks respectively operated by multiple network operators, or multiple subscriber numbers are used by a single terminal device. Such techniques have already been spreading.

Under the above situation, there have several proposals of using multiple subscriber numbers with a single terminal device. For instance, there has been proposed a communication method that enables the use of subscriber numbers with completely different service contents on a commonly used terminal device, and thereby selectively receiving a call or message with any one of the subscriber numbers (For example, see Patent Document 1).

In the proposal disclosed in the above Patent Document 1, a main subscriber number and a subsidiary subscriber number are registered in a rewritable database beforehand and the registered contents are changed as necessary, so that multiple subscriber numbers with service contracts different from each other are capable of being selectively used.

PRIOR ART DOCUMENTS

Patent Document

Patent Document 1: JP 2003-111140 A (claim 1, paragraphs 0006, 0017-0018)

SUMMARY OF THE INVENTION

The Problem to be Solved by the Invention

In the existing short message service, however, even if a subscriber on the receiving side is able to use multiple terminal devices located in networks respectively operated by multiple network operators as described above, it is impossible to receive a call or message with a terminal device which is different from that for the subscriber number designated as a destination of the short message by the transmitting side. Besides, it is impossible to forward the message to the different terminal device.

Accordingly, when a subscriber on the receiving side is not able to receive the short message in the case of powering off the terminal device having the subscriber number designated by a transmitting side as a destination of the short message or in the case of being located at an out of service area, there remains a technical drawback in that it is impossible to receive the short message with the terminal device having another subscriber number instead.

In the technique described in the above Patent Document 1, forwarding of the short message or the like is not originally supposed. Therefore, although it is possible to receive a call or message with a terminal device that has been arbitrarily selected from among multiple terminal devices, there is no proposal of forwarding the short message to another terminal device different from that having the subscriber number designated as a destination by the transmitting side.

The present invention has been made in view of the above circumstances, and has an object of providing a short message service management system, a short message forwarding device, a short message forwarding manner definition information supply device, and a short message forwarding method, thereby allowing a short message to be delivered to a terminal device that has been designated as a destination by the transmitting side to be forwarded and received by a prescribed another terminal device that has been designated beforehand as a forwarding destination.

Solution to the Problem

To address the above drawback, the present invention provides the following system and devices.

According to an aspect of the present invention, there is provided a short message service management system comprising: a short message storing unit for at least temporarily storing a short message to be transmitted to at least one of a plurality of terminal devices used by an identical user; a short message forwarding manner definition information storing unit for storing short message forwarding manner definition information that defines to which one or plural terminal devices the short message stored in the short message storing unit is to be forwarded; a short message forwarding manner definition information supply unit for generating the short message forwarding manner definition information and supplying the short message forwarding manner definition information to the short message forwarding manner definition information storing unit; and a short message forwarding unit for forwarding the short message stored in the short message storing unit to a destination defined by the short message forwarding manner definition information.

In the above short message service management system, the short message storing unit stores at least temporarily a short message to be transmitted to at least one of a plurality of terminal devices used by an identical user.

Also, the short message forwarding manner definition information storing unit stores short message forwarding manner definition information that defines whether the short message stored in the short message storing unit should be forwarded to any one or more of the plurality of terminal devices.

Meanwhile, the short message forwarding manner definition information supply unit generates the short message forwarding manner definition information and supplies the short message forwarding manner definition information to the short message forwarding manner definition information storing unit.

The short message forwarding unit forwards the short message stored in the short message storing unit to a destination defined by the short message forwarding manner definition information.

In the above description, each of the short message storing unit, the short message forwarding manner definition information storing unit, the short message forwarding manner definition information storing unit, and the short message forwarding unit for forwarding the short message to a predetermined destination are arranged, for example, in a communication equipment for a short message service operated by a network operator or each of corresponding part in relay device or the like of a provider.

According to another aspect of the present invention, there is provided a short message forwarding device comprising: a short message storing unit for at least temporarily storing a short message to be transmitted to at least one of a plurality of terminal devices used by an identical user; a short message forwarding manner definition information storing unit for storing short message forwarding manner definition information that defines to which one or plural terminal devices the short message stored in the short message storing unit is to be forwarded; and a short message forwarding unit for forwarding the short message stored in the short message storing unit to a destination defined by the short message forwarding manner definition information.

In the above short message forwarding device, the short message storing unit at least temporarily stores a short message to be transmitted to at least one of a plurality of terminal devices used by an identical user.

In addition, the short message forwarding manner definition information storing unit stores short message forwarding manner definition information that defines whether the short message stored in the short message storing unit should be forwarded to any one or more of the plurality of terminal devices.

Further, the short message forwarding unit forwards the short message stored in the short message storing unit to a destination defined by the short message forwarding manner definition information.

In the above short message forwarding device, the short message storing unit, the short message forwarding manner definition information storing unit, and the short message forwarding unit are arranged in predetermined short message relay equipment for forwarding the short message in a short message service system.

In the above short message forwarding device, each of the short message storing unit, the short message forwarding manner definition information storing unit, and the short message forwarding unit is arranged in a predetermined short message relay device for forwarding the short message in a short message service system, as each of functional parts therein.

According to another aspect of the present invention, there is provided a short message forwarding manner definition information supply device that supplies short message forwarding manner definition information to a short message forwarding device, the short message forwarding manner definition information supply device comprising: a short message forwarding manner definition information generating unit for generating the short message forwarding manner definition information; and a short message forwarding manner definition information transmitting unit for transmitting the short message forwarding manner definition information generated by the short message forwarding manner definition information generating unit to the short message forwarding device, and the short message forwarding device comprising: a short message storing unit for at least temporarily storing a short message to be transmitted to at least one of a plurality of terminal devices used by an identical user; and a short message forwarding manner definition information storing unit for storing short message forwarding manner definition information that defines to which one or plural terminal devices the short message stored in the short message storing unit is to be forwarded.

The above short message forwarding manner definition information supply device that supplies short message forwarding manner definition information to a short message forwarding device, and the short message forwarding device includes: a short message storing unit for at least temporarily storing a short message to be transmitted to at least one of a plurality of terminal devices used by an identical user; and a short message forwarding manner definition information storing unit for storing short message forwarding manner definition information that defines whether the short message stored in the short message storing unit should be forwarded to any one or more of the plurality of terminal devices.

The short message forwarding manner definition information generating unit generates the short message forwarding manner definition information.

The short message forwarding manner definition information transmitting unit transmits the short message forwarding manner definition information generated by the short message forwarding manner definition information generating unit to the short message forwarding device.

In the above short message forwarding manner definition information supply device, the short message forwarding manner definition information generating unit generates the short message forwarding manner definition information in response to manipulation of a terminal device by a user using a short message service.

In the above short message forwarding manner definition information supply device, for example, the short message forwarding manner definition information generating unit generates the short message forwarding manner definition information in case that a user operates a terminal device and uses a short message service.

In the above short message forwarding manner definition information supply device, the short message forwarding manner definition information generating unit automatically generates the short message forwarding manner definition information based upon a history of the user's use situation of the service.

In the above short message forwarding manner definition information supply device, the short message forwarding manner definition information generating unit automatically generates the short message forwarding manner definition information based upon a history of the user's use situation of the service, for example, the history may be accumulated in a device of the network operator with which the user on the receiving side has made a contract as a subscriber.

In the above short message forwarding manner definition information supply device, the short message forwarding manner definition information generating unit automatically generates the short message forwarding manner definition information based upon location information of the terminal device used by the user.

In the short message forwarding manner definition information supply device, the short message forwarding manner definition information generating unit automatically generates the short message forwarding manner definition information based upon location information of the terminal device used by the user, for example, based upon GPS information or information on in-service area.

According to yet another aspect of the present invention, there is provided a short message forwarding method comprising: at least temporarily storing a short message to be transmitted to at least one of a plurality of terminal devices used by an identical user; generating short message forwarding manner definition information that defines to which one or plural terminal devices the short message stored in the storing is to be forwarded; at least temporarily storing the short message forwarding manner definition information generated; and forwarding the short message stored to a destination defined by the short message forwarding manner definition information in a manner defined by the short message forwarding manner definition information.

In the above short message forwarding method, the short message at least temporarily stored in the storing to be transmitted to at least one of a plurality of terminal devices is forwarded in the forwarding in a forwarding manner defined by the short message forwarding manner definition information generated in the generating and stored in the storing.

Figure 1:
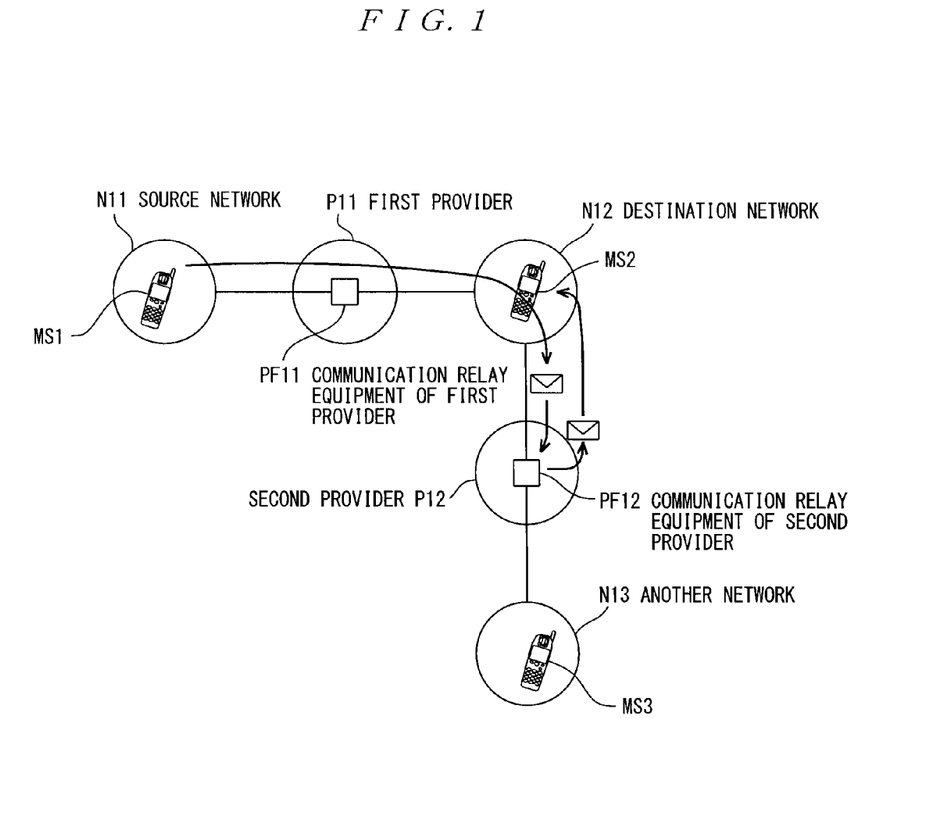
FIG. 1 is a conceptual view illustrative of the outline of a short message service management system according to one condition of the present invention.

In an example of FIG. 1, there is shown a case where data is transmitted in a store-and-forward system from a source network N11 where a terminal device MS1 on the transmitting side that is a source of transmission of the short message is located to a destination network N12 where a terminal device MS2 on the receiving side that is a destination of the message is located. It is supposed that a short message forwarding function to be described later is set to off.

Advantageous Effect of the Invention

According to the present invention, a short message service management system, a short message forwarding device, a short message forwarding manner definition information supply device, and a short message forwarding method are achieved, thereby allowing a short message to be delivered to a terminal device that has been designated as a destination by the transmitting side to be forwarded and received by a prescribed another terminal device that has been designated beforehand as a forwarding destination.

DESCRIPTION OF EMBODIMENTS

Hereinafter, embodiments of the present invention will be described in detail with reference to the accompanying drawings. In each of the drawings to be referred to, for sake of convenience, main components to be the subjects of the description will be magnified as necessary, whereas parts other than the main components will be simplified or omitted as necessary.

FIG. 1 is a conceptual view illustrative of the outline of a short message service management system according to one condition of the present invention.

In an example of FIG. 1, there is shown a case where data is transmitted in a store-and-forward system from a source network N11 where a terminal device MS1 on the transmitting side that is a source of transmission of the short message is located to a destination network N12 where a terminal device MS2 on the receiving side that is a destination of the message is located. It is supposed that a short message forwarding function to be described later is set to off.

Also, in FIG. 1, another network N13 where a side terminal device MS3 is located is not involved in the transmission and reception of the short message under the condition supposed as described above.

As illustrated, in this short message service management system, a first provider P11 (communication relay equipment PF11 thereof) is supposed to be included between a source network N11 and a destination network N12, and in addition, a second provider P12 (communication relay equipment PF12 thereof) is supposed to be included between the destination network N12 and another network N13.

In such a configuration, the first provider P11 (the communication relay equipment PF11) is provided as a functional part that simply relays information (short message) in the present example, and is not an essential component for embodying the present invention.

Meanwhile, the second provide P12 (the communication relay equipment PF12 thereof) is provided in a short message transmission system in the above-described manner. The communication relay equipment PF12 is provided with a short message storing unit and a short message forwarding unit, as will be described later in detail.

Specifically, the second provider P12 (the communication relay equipment PF12) may be provided as a functional part that simply relays information (short message). Additionally, the short message storing unit and the short message forwarding unit can be arranged in the network N12 (the above-described destination network N12), as will be described later in detail.

The short message storing unit at least temporarily stores a short message to be delivered to one (an example is the MS2) of multiple terminal devices used by an identical user (an example is the user of the terminal device MS2).

Also, the short message forwarding unit forwards the short message to a defined destination according to short message forwarding manner definition information that defines to which one or plural terminal device (s) the short message stored in the short message storing unit should be forwarded out of multiple terminal devices.

The short message forwarding manner definition information as described above is optionally set by a user manually with the use of the terminal device (an example is the MS2), or is automatically set based upon history information of communication.

The second provider P12 (the communication relay equipment PF12 thereof) functions as described above, is operated by a network operator that operates both communication lines of the destination network N12 and another network N13 in the configuration of FIG. 1, user account information thereof and the like and manages as the number (or International Mobile Subscriber Identity: IMSI) of the terminal device located in the destination network N12, and the number (or IMSI) of the terminal device located in another network N13.

Figure 2:
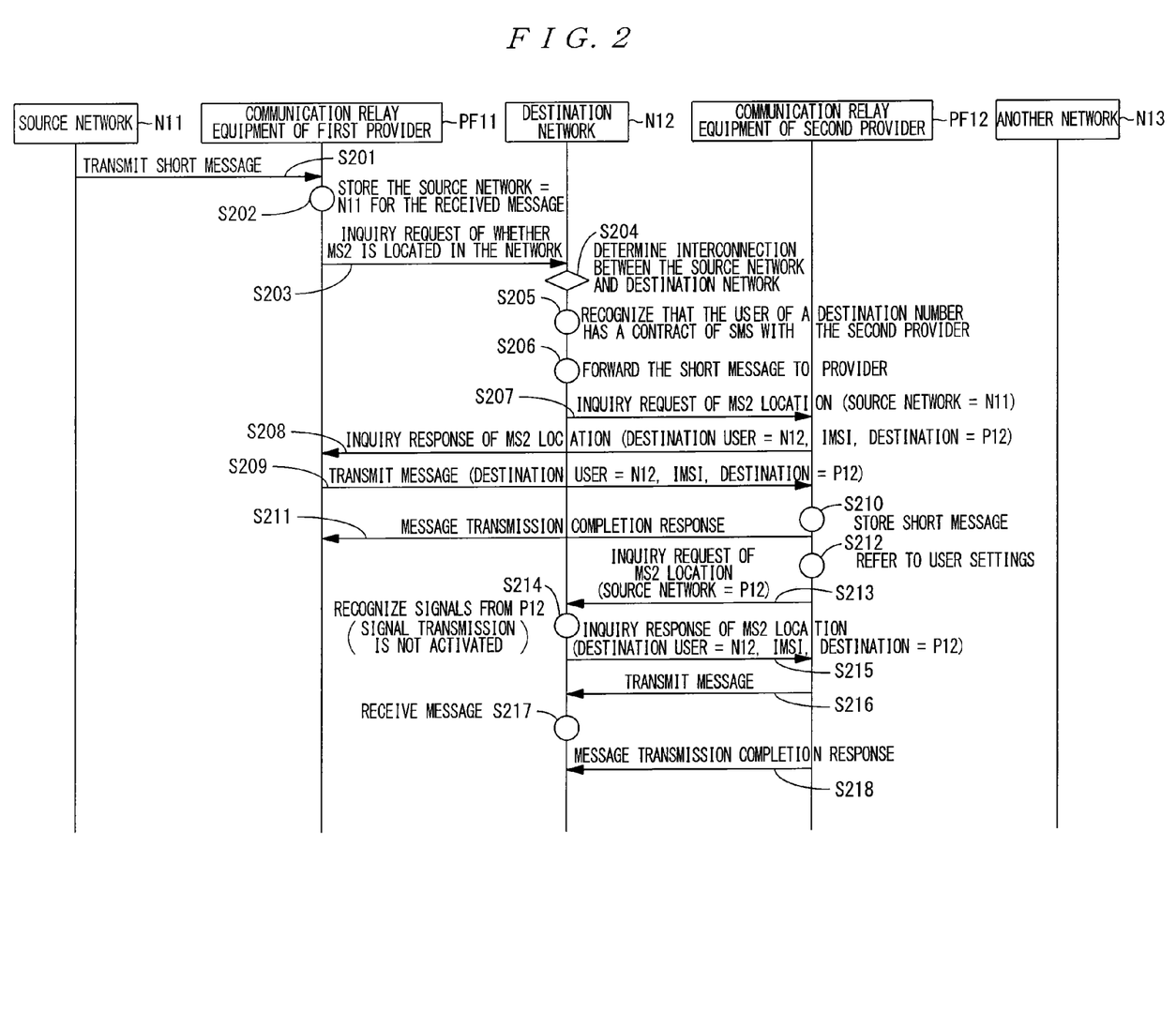
FIG. 2 is a sequence chart illustrative of operations of a short message service management system in the case of FIG. 1.

With such numbers (or IMSI) of the terminal devices, the short message forwarding manner definition information as described above is concretely recognized by the communication relay equipment PF12. Then, the necessary forwarding of the short message is carried out based upon this information. FIG. 2 is a sequence chart illustrative of operations of a short message service management system in the case of FIG. 1.

In relation to the short message forwarding, a further description will be given in more detail with reference to the accompanying drawings as necessary.

Note that, as described above, in the case of FIG. 1, it is supposed that the short message forwarding function is set to off. Therefore, the short message originated from the terminal device MS1 on the transmitting side (the source network N11) of a source of transmission is transmitted via the second provider P12 (the communication relay equipment PF12 thereof) to the terminal device MS2 on the receiving side (the destination network N12) that is an original destination, without a particular forwarding processing.

FIG. 2 is a sequence chart illustrative of operations of a short message service management system in the case of FIG. 1.

In the case of FIG. 2, in particular, the connection from the source network N11 to another network N13 is enabled via the first provider P11 (the communication relay equipment PF11 thereof) and the second provider P12 (the communication relay equipment PF12 thereof). Prior to the transmission of data to be transmitted (which is a short message in the case of the short message service), the source network N11 issues an inquiry request of inquiring whether the MS2 is located in the destination network N12 to carry out the connection determination.

Also, FIG. 2 illustrates a case where the connection between the source network N11 and another network N13 is admitted.

Note that, in FIG. 2, another network N13 is illustrated for reference to another example to be described later, but is not involved in the normal transmission of the short message from the source network N11 to the destination network N12.

Next, the short message service management system according to the present invention will be described with reference to FIG. 1 and FIG. 2, as necessary.

In transmitting a short message from the source network N11 (the terminal device MS1 on the transmitting side) to the destination network N12 (the MS2 on the receiving side), the short message is firstly transmitted to the communication relay equipment PF11 of the first provider P11 (step S201).

In step S201, the communication relay equipment PF11 of the first provider P11 that received the short message at step S201 maintains information representing that the source network N11 is a source of transmission without updating the information (step S202).

Then, an inquiry request of inquiring whether the MS2 is located in the destination network N12 is issued from the communication relay equipment PF11 of the first provider P11 to the destination network N12 (step S203).

In the destination network N12, an interconnection determination is performed between the source network N11 and the destination network N12 (step S204). When it is confirmed that a condition for normal communication is established between the source network N11 and the destination network N12, it is further recognized that the user of a destination number has made a contract of the short message service (SMS) with the second provider (step S205).

On the basis of the recognition at step S205, it is recognized that the short message should be transmitted to the second provider P12 (the communication relay equipment PF12 thereof) (step S206).

The recognition at step S206 issues the inquiry request of MS2 location to the second provider P12 (the communication relay equipment PF12 thereof) from the destination network N12 (step S207).

In the present embodiment, also in this case, the information representing that the source network N11 is a source of transmission is maintained without being updated.

The destination network N12 that received the inquiry request at step S207 returns an inquiry response of MS2 location to the communication relay equipment PF11 of the first provider P11 (step S208).

The inquiry response of MS2 location at step S208 includes the information that the receiving user of a destination is in the destination network N12, is operated with the IMSI of the terminal device located in the network, and is operated by the second provider P12.

The communication relay equipment PF11 of the first provider P11 that received the response at step S208 transmits the short message to the second provider P12 (the communication relay equipment PF12 thereof) (step S209).

The second provider P12 (the communication relay equipment PF12 thereof) that received the short message transmitted at step S209 stores the short message in the short message storing unit composed of a predetermined memory device (step S210).

After the short message is stored at step S210, the second provider P12 (the communication relay equipment PF12 thereof) returns a message transmission completion response to the first provider P11 (the communication relay equipment PF11 thereof) (step S211).

Subsequent to step S211, the second provider P12 (the communication relay equipment PF12 thereof) confirms user settings in relation to message forwarding (step S212).

The confirmation at step S212 is a process of confirming a short message forwarding manner with reference to the short message forwarding manner definition information.

As described above, the short message forwarding manner definition information is information that defines to which one or plural terminal device (s) the short message stored in the short message storing unit should be forwarded out of multiple terminal devices. As one manner, a user manually sets the information from the terminal device.

Then, the second provider P12 (the communication relay equipment PF12 thereof) issues an inquiry request of MS2 location to the destination network N12 with the second provider P12 set as a source of transmission (step S213).

The destination network N12 that has recognized signals from the second provider P12 at step S213 does not activate the transmission process in the manner of forwarding to the terminal device within the destination network itself that is an original destination (step S214).

Subsequently, a location inquire response is returned from the destination network N12 to the second provider P12 (the communication relay equipment PF12 thereof) (step S215).

The second provider P12 (the communication relay equipment PF12 thereof) transmits the short message stored at step S210 to the destination network N12 according to the response of step S215 (step S216).

On receipt of the short message transmitted at step S216 (step S217), a transmission completion response is returned to the second provider P12 (the communication relay equipment PF12 thereof) from the destination network N12 (step S218).

As described heretofore, the short message originated from the terminal device MS1 on the transmitting side (the source network N11) is transmitted to the MS2 on the receiving side (the destination network N12) that is an original destination via the second provider P12 (the communication relay equipment PF12 thereof), without a particular forwarding processing.

Figure 3:
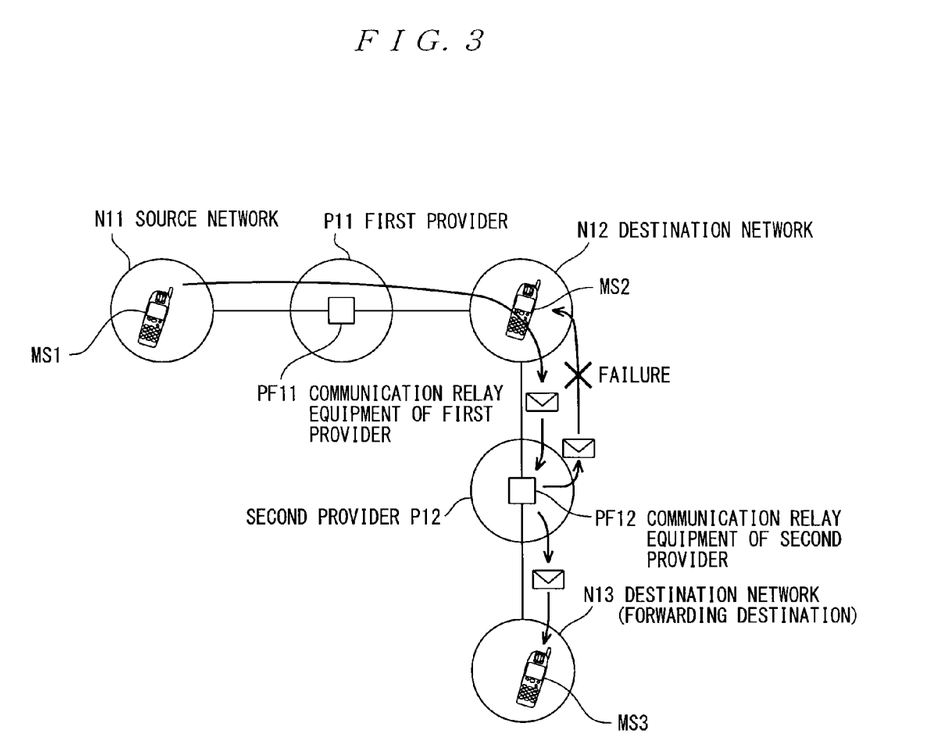
FIG. 3 is a conceptual view illustrative of the outline of a short message service management system according to another condition of the present invention.

FIG. 3 is a conceptual view illustrative of the outline of a short message service management system according to another condition of the present invention.

In another example of FIG. 3, when a short message is transmitted from the source network N11 where the terminal device MS1 on the transmitting side that is a source of transmission of the short message is located to the terminal device MS2 on the receiving side that is a destination, it is impossible to transmit the short message because the terminal device MS2 on the receiving side is not located in the destination network N12. However, a short message forwarding function allows the short message to be forwarded to a terminal device MS3 that is located in another destination network (forwarding destination) N13.

In the example of FIG. 3, by comparison with the example of FIG. 1, the supposed condition is different. However, the terminal devices, networks, and providers (communication relay equipment thereof), which are the components of the short message service management system, are same. Each of the components has the same reference numeral with that of FIG. 1, and the detailed description thereof will be omitted.

Figure 4:
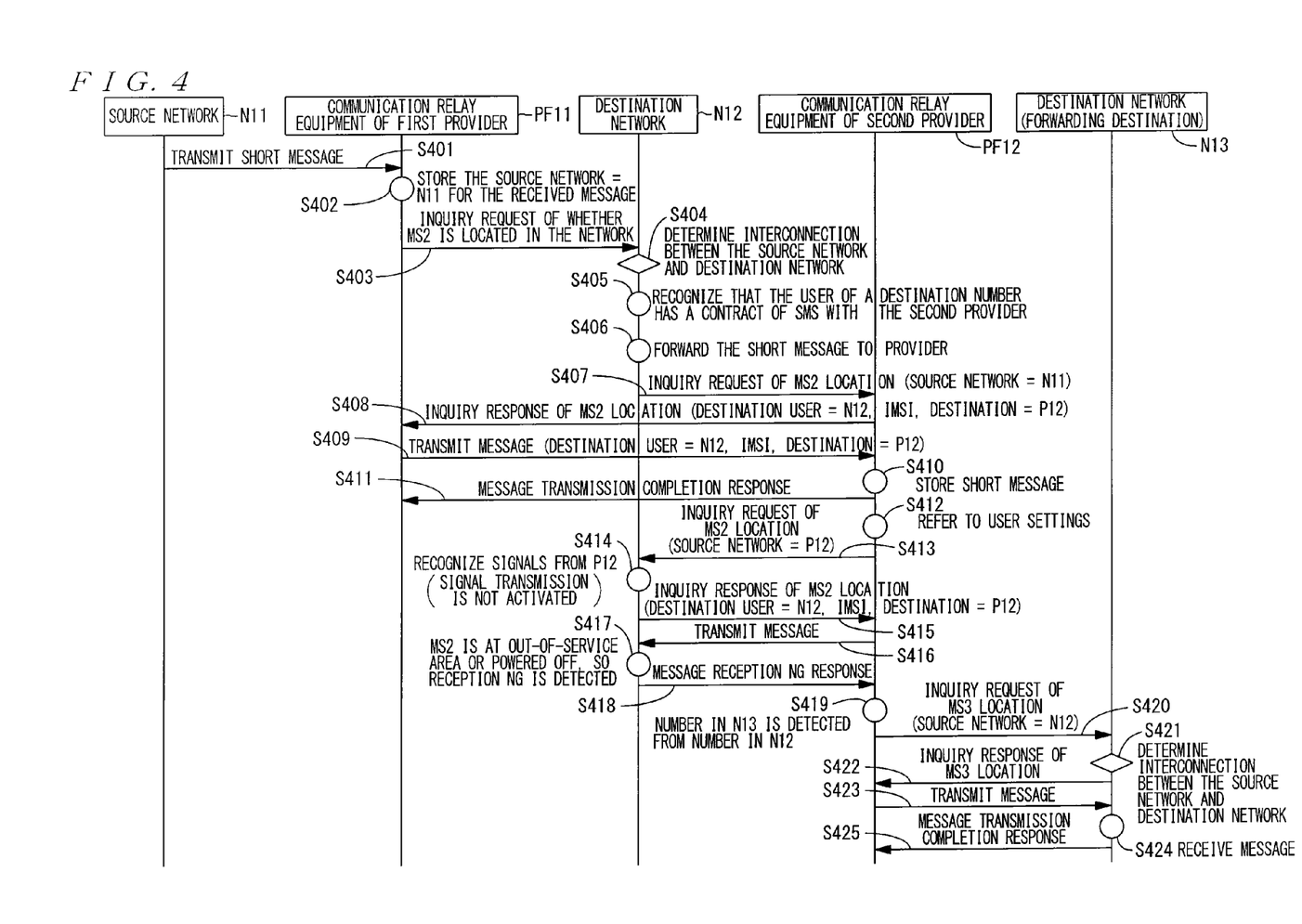
FIG. 4 is a sequence chart illustrative of operations of a short message service management system in the case of FIG. 3.

In FIG. 3, under the condition supposed as described, the functions served by the respective components of the short message service management system will be demonstrated by describing the operations thereof with reference to FIG. 4.

FIG. 4 is a sequence chart illustrative of operations of a short message service management system in the case of FIG. 3.

In transmitting a short message from the source network N11 (the terminal device MS1 on the transmitting side) to the destination network N12 (the terminal device MS2 on the receiving side), the short message is firstly transmitted to the communication relay equipment PF11 of the first provider P11 (step S401).

The communication relay equipment PF11 of the first provider P11 that received the short message at step S401 maintains information representing that the source network N11 is a source, without being updated (step S402).

Then, an inquiry request of MS2 location is issued from the communication relay equipment PF11 of the first provider P11 to the destination network N12 (step S403).

In the destination network N12, an interconnection determination is performed between the source network N11 and the destination network N12 (step S404). When it is confirmed that a condition for normal communication is established between the source network N11 and the destination network N12, it is further recognized that the user of a destination number has made a contract of the short message service (SMS) with the second provider (step S405).

On the basis of the recognition at step S405, it is recognized that the short message should be transmitted to the second provider P12 (the communication relay equipment PF12 thereof) (step S406).

The recognition at step S406 issues the inquiry request of MS2 location to the second provider P12 (the communication relay equipment PF12 thereof) from the destination network N12 (step S407).

In the present example, also in this case, the information representing that the source network N11 is a source of transmission is maintained without being updated.

The destination network N12 that received the inquiry of MS2 location at step S407 returns an inquiry response of MS2 location to the communication relay equipment PF11 of the first provider P11 (step S408).

The inquiry response of step S408 includes the information that the receiving user of a destination is in the destination network N12, is operated with the IMSI of the terminal device located in the network, and is operated by the second provider P12.

The communication relay equipment PF11 of the first provider P11 that received the response of step S408 transmits the short message to the second provider P12 (the communication relay equipment PF12 thereof) (step S409).

The second provider P12 (the communication relay equipment PF12 thereof) that received the short message transmitted at step S409 stores the short message in the short message storing unit composed of a predetermined memory device (step S410).

After the short message is stored at step S410, the second provider P12 (the communication relay equipment PF12 thereof) returns a message transmission completion response to the first provider P11 (the communication relay equipment PF11 thereof) (step S411).

Subsequent to step S411, the second provider P12 (the communication relay equipment PF12 thereof) confirms user settings in relation to forwarding (step S412).

The confirmation of step S412 is a process of confirming a short message forwarding manner with reference to the short message forwarding manner definition information.

As described above, the short message forwarding manner definition information is information that defines to which one or plural terminal device (s) the short message stored in the short message storing unit should be forwarded out of multiple terminal devices. As one manner, a user manually sets the information from the terminal device.

Then, the second provider P12 (the communication relay equipment PF12 thereof) issues an inquiry request of MS2 location to the destination network N12 with the second provider P12 set as a source (step S413).

The destination network N12 that recognized signals from the second provider P12 at step S413 does not activate the transmission process in the manner of forwarding to the terminal device within the destination network itself that is an original destination (step S414).

Subsequently, a location inquiry response of MS2 location is returned from the destination network N12 to the second provider P12 (the communication relay equipment PF12 thereof) (step S415).

The second provider P12 (the communication relay equipment PF12 thereof) activates the transmission process of transmitting the short message stored at step S410, as described, to the destination network N12 according to the response of step S415 (step S416).

In the case of FIG. 4 (FIG. 3, accordingly), since the condition as described above is supposed, the short message to be transmitted at step S416 is not transmitted because of the terminal device is at an out-of-service area (or the terminal device is powered off) or another reason. A reception No Good (NG) is detected (step S417).

For this reason, a transmission NG response is returned to the second provider P12 (the communication relay equipment PF12 thereof) from the destination network N12 (step S418).

The second provider P12 (the communication relay equipment PF12 thereof) that received the NG response at step S418 detects the corresponding number (or IMSI) in another network N13, which is a forwarding destination and in which the terminal device MS3 is located, from the number (or IMSI) in the destination network N12 where the terminal device MS2 is located and which used to be an original destination of the short message (step S419).

The following description is the reason why the number (or IMSI) of step S419 can be referred to.

Specifically, the second provider P12 (the communication relay equipment PF12 thereof) stores the short message forwarding manner definition information in a short message forwarding manner definition information storing unit thereof. This allows the reference to the number (or IMSI) at step S419 based upon the short message forwarding manner definition information that has been stored.

In the present embodiment, the short message forwarding manner definition information is information of defining to which one or plural terminal device(s) the short message temporarily stored in a short message storing unit provided in the second provider P12 (the communication relay equipment PF12 thereof) should be forwarded out of multiple terminal devices with which users who are subscribers on the receiving side have made contracts, respectively.

As described heretofore, the second provider P12 (the communication relay equipment PF12 thereof) is operated by a network operator who manages both communication lines of the destination network N12 and another network N13 in the configuration of FIG. 1, user account information thereof and the like and manages as the number (or IMSI) of the terminal device located in the destination network N12 and the number (or IMSI) of the terminal device located in another network N13.

With these numbers (or IMSIs) of the terminal devices, the above-described short message forwarding manner definition information is concretely recognized in the communication relay equipment PF12. On the basis of the information, a predetermined forwarding process in relation to the short message is performed.

As described above, in a case where the short message with the destination of the terminal device located in the destination network N12 is forwarded to the terminal device in another network N13, instead of forwarding to the terminal device located in the destination network N12 or in parallel with forwarding to the terminal device in the destination network N12, the correspondence relationship between the terminal devices of both networks is provided to be referred to with the use of the numbers (or IMSIs) of the terminal devices.

Accordingly, the number (or IMSI) of the terminal device on the destination network N12 side identifies the corresponding terminal device on another network N13 side, whereas, the number (or IMSI) of the terminal device on another network N13 side identifies the corresponding terminal device on the destination network N12 side.

In recognition of the number (or IMSI) of the terminal device MS3 in another network N13 detected at step S419 as a forwarding destination, the second provider P12 (the communication relay equipment PF12 thereof) issues an inquiry request of MS3 location to another network N13 (step S420).

In another network N13, the interconnection determination is performed between the source network and the destination network (step S421). When it is confirmed that the condition for the normal communication is established between both networks, the location response is returned to the second provider P12 (the communication relay equipment PF12 thereof) (step S422).

The second provider P12 (the communication relay equipment PF12 thereof) that received the location response at step S422 transmits the short message temporarily stored in the short message storing unit at step S410 to another network N13 (the terminal device MS13) (step S423).

The network N13 (the terminal device MS13) receives the short message transmitted at step S423 (step S424), and then returns a short message receive completion response to the second provider P12 (the communication relay equipment PF12 thereof) (step S425).

As described heretofore, in a case where the short message transmitted from the source network N11 (the terminal device MS11) cannot be received in the destination network N12 (the terminal device MS12) that is an original destination, the short message is forwarded to the destination defined by the short message forwarding manner definition information that defines the forwarding destination corresponding to the terminal device MS12.

Figure 5:
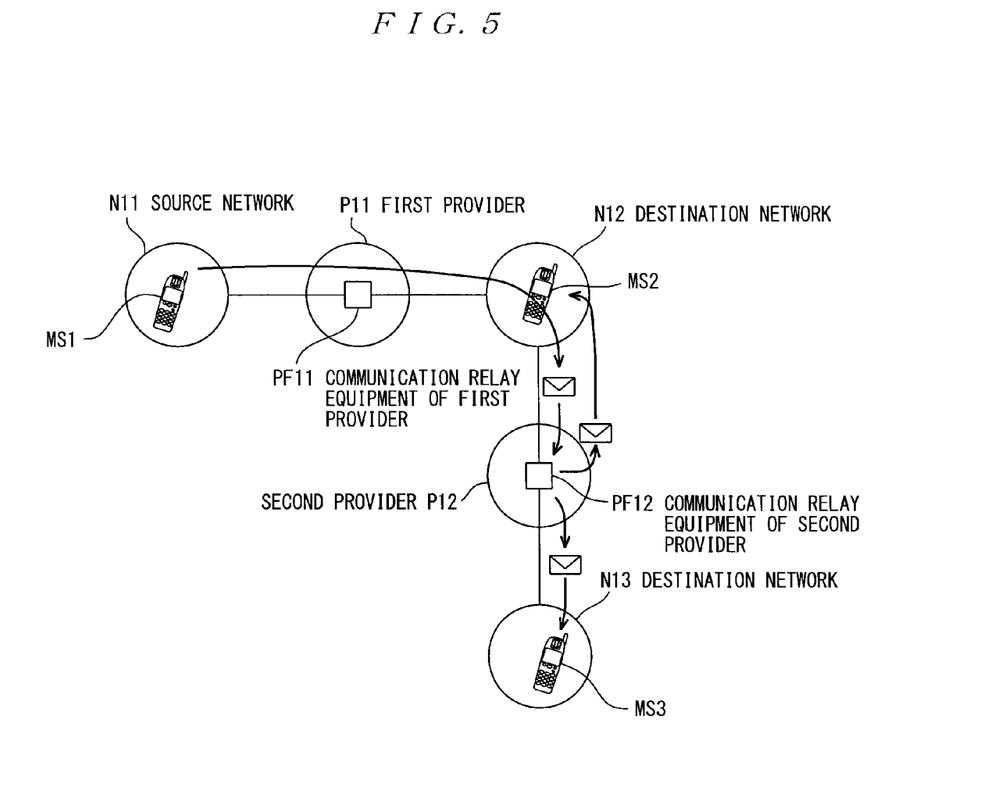
FIG. 5 is a conceptual view illustrative of the outline of a short message service management system according to further another condition of the present invention.

FIG. 5 is a conceptual view illustrative of the outline of a short message service management system according to further another condition of the present invention.

In the example of FIG. 5, it is supposed that the terminal device MS2 (the destination network N12) is set as one destination from the source network N11 where the terminal device MS1 on the transmitting side that is a source of transmission of a short message is located, and in addition, another terminal device MS3 (the network N13) is also set as another destination, so that the replica of the same short message can be transmitted.

In the example of FIG. 5, in comparison with the example of FIG. 1, the supposed condition is different, but each of the components in the short message service management system, such as a terminal device, network, and provider (relay equipment thereof) are the same. The description for each of the components will be omitted with the same referential numeral given as the case of FIG. 1.

Figure 6:
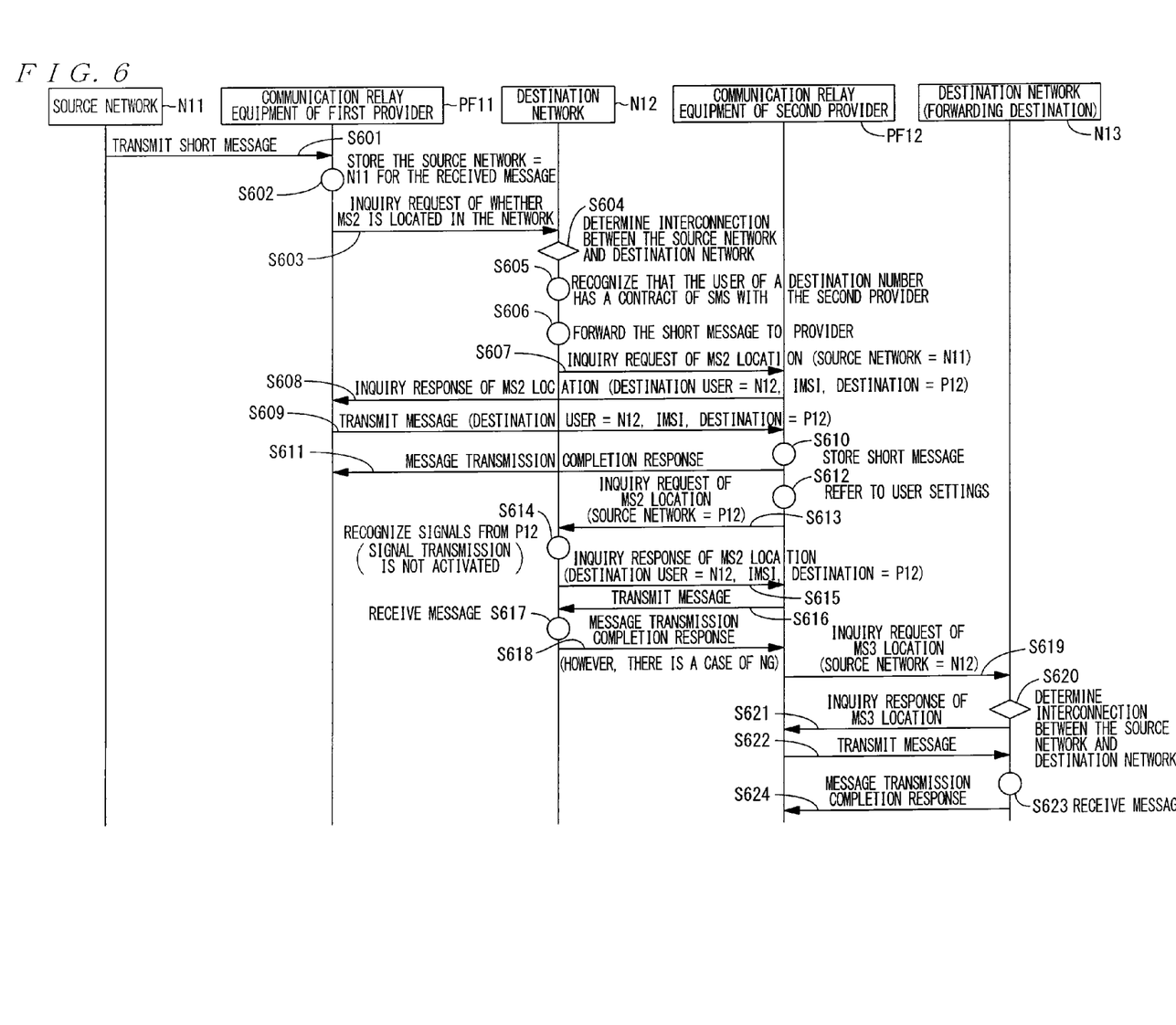
FIG. 6 is a sequence chart illustrative of operations of a short message service management system in the case of FIG. 5.

In FIG. 5, under the condition supposed as described, the functions served by the respective components in the short message service management system will be demonstrated by describing the operations with reference to FIG. 6.

FIG. 6 is a sequence chart illustrative of operations of a short message service management system in the case of FIG. 5.

In transmitting s short message from the source network N11 (the terminal device MS1 on the transmitting side) to the destination network N12 (the terminal device MS2 on the receiving side), the short message is firstly transmitted to the communication relay equipment PF11 of the first provider P11 (step S601).

The communication relay equipment PF11 of the first provider P11 that received the short message at step S601 maintains information representing that the source network N11 is a source of transmission, without being updated (step S602).

Then, an inquiry request of MS2 location is issued from the communication relay equipment PF11 of the first provider P11 to the destination network N12 (step S603).

In the destination network N12, an interconnection determination is performed between the source network N11 and the destination network N12 (step S604). When it is confirmed that a condition for normal communication is established between the source network N11 and the destination network N12, it is further recognized that the user of a destination number has made a contract of the short message service (SMS) with the second provider (step S605).

On the basis of the recognition at step S605, it is recognized that the short message should be transmitted to the second provider P12 (the communication relay equipment PF12 thereof) (step S606).

The recognition at step S606 issues the inquiry request of MS2 location to the second provider P12 (the communication relay equipment PF12 thereof) from the destination network N12 (step S607).

In the present embodiment, also in this case, the information representing that the source network N11 is a source of transmission is maintained without being updated.

The destination network N12 that received the inquiry request of MS2 location at step S607 returns a location inquiry response of MS2 location to the communication relay equipment PF11 of the first provider P11 (step S608).

The inquiry response of step S608 includes the information that the receiving user of a destination is the destination network N12, is operated with the IMSI of the terminal device located in the network, and is operated by the second provider P12.

The communication relay equipment PF11 of the first provider P11 that received the response of step S608 transmits the short message to the second provider P12 (the communication relay equipment PF12 thereof) (step S609).

The second provider P12 (the communication relay equipment PF12 thereof) that received the short message transmitted at step S609 stores the short message in the short message storing unit composed of a predetermined memory device (step S610).

After the short message is stored at step S610, the second provider P12 (the communication relay equipment PF12 thereof) returns a message transmission completion response to the first provider P11 (the communication relay equipment PF11 thereof) (step S611).

Subsequent to step S611, the second provider P12 (the communication relay equipment PF12 thereof) confirms user settings in relation to forwarding (step S612).

The confirmation of step S612 is a process of confirming a short message forwarding manner with reference to the short message forwarding manner definition information.

As described above, the short message forwarding manner definition information is information that defines to which one or plural terminal device (s) the short message stored in the short message storing unit should be forwarded out of multiple terminal devices. As one manner, a user manually sets the information from the terminal device. In particular, in the case of FIG. 6 (therefore, FIG. 5), since the replica of the short message is set to be transmitted to the corresponding terminal device as described above, the short message is transmitted to this terminal device.

Firstly, in order to transmit the short message to the terminal device MS2 as one destination, the second provider P12 (the communication relay equipment PF12 thereof) issues an inquiry request of MS2 location to the destination network N12 with the source of transmission set to the second provider P12 (step S613).

The destination network N12 that recognized the signals from the second provider P12 at step S613 does not activate the transmission process in the manner of forwarding to the terminal device within the destination network itself that is an original destination (step S614).

Subsequently, a location inquire response is returned from the destination network N12 from the second provider P12 (the communication relay equipment PF12 thereof) (step S615).

The second provider P12 (the communication relay equipment PF12 thereof), according to the response of step S615, transmits the short message stored at the above step S610 to the destination network N12 (step S616).

The short message transmitted at step S616 is received by the second provider P12 (the communication relay equipment PF12 thereof) (step S617), and then a completion response representing that the reception is completed is returned to the second provider P12 (the communication relay equipment PF12 thereof) (step S618).

Then, an inquiry request of MS3 location is issued to the network N13 of the terminal device MS3 that is a destination in order to forward the short message (previously called replica) temporarily stored at step S610 (step S619).

In the network N13, an interconnection determination between the source network and the destination network is performed (step S620). When it is confirmed that a condition for normal communication is established between both networks, the location response is returned to the second provider P12 (the communication relay equipment PF12 thereof) (step S621).

The second provider P12 (the communication relay equipment PF12 thereof) that received the location response at step S621 transmits the short message (replica) temporarily stored in the short message storing unit at step S610 to the network N13 (the terminal device MS13) (step S622).

The network N13 (the terminal device MS13) receives the short message transmitted at step S622 (step S623), and then returns a short message receive completion response to the second provider P12 (the communication relay equipment PF12 thereof) (step S624).

As described heretofore, the short message transmitted from the source network N11 (the terminal device MS11) is transmitted to the destination network N12 (the terminal device MS12) that is an original destination, and is also delivered to the destination defined by the short message forwarding manner definition information in the manner of forwarding the short message (replica).

Figure 7:
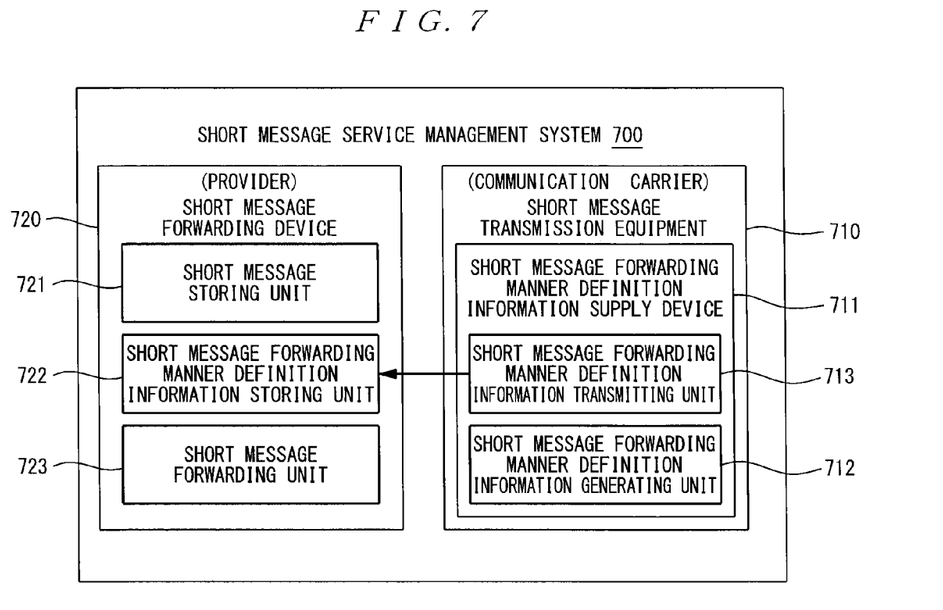
FIG. 7 is a functional block diagram illustrative of a configuration of the short message service management system according to the present invention.

FIG. 7 is a functional block diagram illustrative of a configuration of the short message service management system according to the present invention.

A short message service management system 700 includes a short message transmission equipment 710 arranged mainly under the control of a network operator, and a short message forwarding device 720 arranged mainly under the control of a provider.

The short message forwarding device 720 corresponds to the communication relay equipment PF12 operated by the second provider P12 that has been described with reference to FIG. 1 to FIG. 6, and includes a short message storing unit 721, a short message forwarding manner definition information storing unit 722, and a short message forwarding unit 723.

The short message storing unit 721 at least temporarily stores a short message to be delivered to one of multiple terminal devices used by an identical user.

The short message forwarding manner definition information storing unit 722 stores short message forwarding manner definition information that defines that the short message stored in the short message storing unit 721 should be forwarded to anyone or multiple terminal devices from among multiple terminal devices with which a subscribed on the receiving side has made a contract.

The short message forwarding unit 723 forwards the short message stored in the short message storing unit 721 to a destination, which is defined by the short message forwarding manner definition information stored in the short message forwarding manner definition information storing unit 722.

Meanwhile, the short message transmission equipment 710 is provided with a short message forwarding manner definition information supply device 711.

The short message forwarding manner definition information supply device 711 includes a short message forwarding manner definition information generating unit 712 that generates short message forwarding manner definition information, and a short message forwarding manner definition information transmitting unit 713 that supplies the short message forwarding manner definition information storing unit 722 of the short message forwarding device 720 with the short message forwarding manner definition information that has been generated by the short message forwarding manner definition information generating unit 712.

As an embodiment, in the short message forwarding manner definition information supply device 711, the short message forwarding manner definition information generating unit 712 may be configured to automatically generate the short message forwarding manner definition information based upon the history of use situations, of services including the short message service, understood by the network operator.

Also, as another embodiment, in the short message forwarding manner definition information supply device 711, the short message forwarding manner definition information generating unit 712 may be configured to automatically generate the short message forwarding manner definition information based upon information representing the location of the terminal device to be used for reception, such as information on GPS (Global Positioning System) or information detected according to the location situation.

Figure 8:
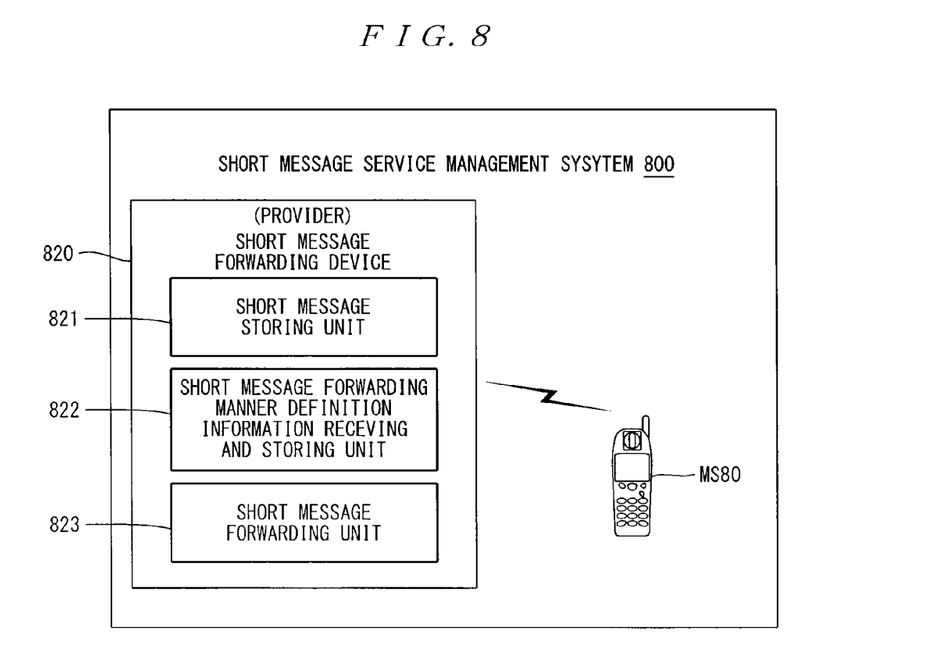
FIG. 8 is a functional block diagram illustrative of another configuration of the short message service management system according to the present invention.

FIG. 8 is a functional block diagram illustrative of another configuration of the short message service management system according to the present invention.

A short message service management system 800 includes a short message forwarding device 820 arranged mainly under the control of a provider, and a terminal device MS80 that serves functions of generating short message forwarding manner definition information and supplying the short message forwarding manner definition information to a short message forwarding manner definition information storing unit.

The short message forwarding device 820 corresponds to the communication relay equipment PF12 of the second provider operated by the second provider P12 that has been described with reference to FIG. 1 to FIG. 6, and includes a short message storing unit 821, a short message forwarding manner definition information storing unit 822, and a short message forwarding unit 823.

The short message storing unit 821 at least temporarily stores a short message to be delivered to one of multiple terminal devices used by an identical user.

The short message forwarding manner definition information storing unit 822 generates short message forwarding manner definition information and then stores the short message forwarding manner definition information.

In other words, there is provided a function of causing a guidance display relating to input operation on the terminal device MS80. The short message forwarding manner definition information is generated according to an external operation performed on the terminal device MS80 by the user in accordance with such a guidance display.

The short message forwarding manner definition information generated in cooperation of the short message forwarding manner definition information storing unit 822 and the terminal device MS80 is transmitted from the terminal device MS80 in the manner of a short message.

The short message forwarding manner definition information that has been transmitted as described above is received by the short message forwarding manner definition information storing unit 822 and then stored therein.

Incidentally, the reception and transmission of the information on the terminal device MS80 is performed via radio space, but is already known. Therefore, the description will be omitted.

The short message forwarding unit 823 forwards the short message stored in the short message storing unit 821 to a destination that is defined by the short message forwarding manner definition information stored in the short message forwarding manner definition information storing unit 822.

Figure 9:
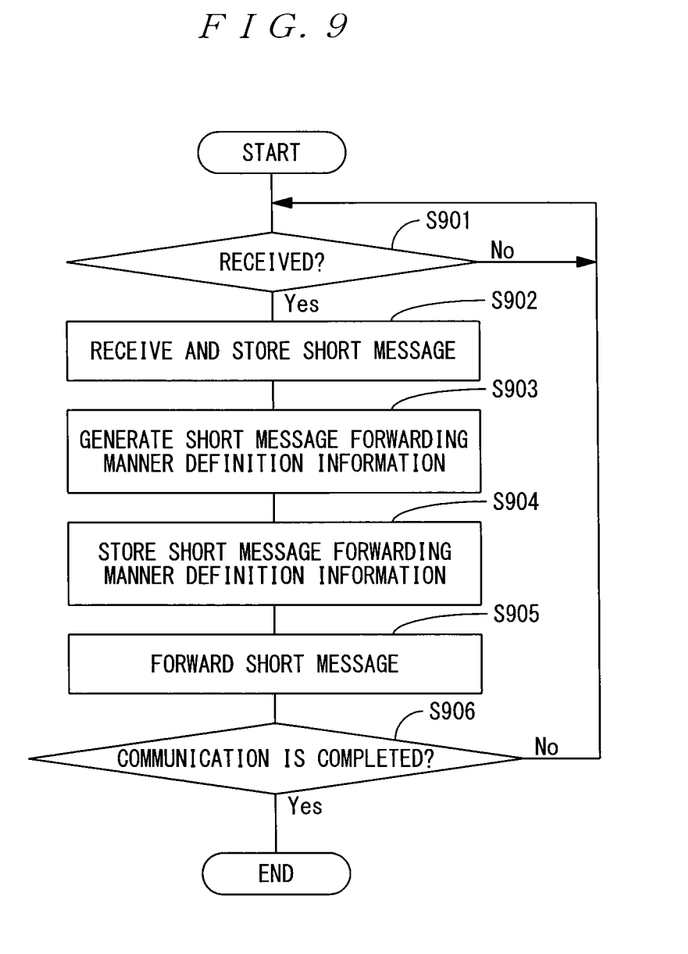
FIG. 9 is a flowchart illustrative of the outline of a short message forwarding method according to the present invention.

FIG. 9 is a flowchart illustrative of the outline of a short message forwarding method according to the present invention.

In the system to which the above method is applied, the reception of a short message is waited for (step S901: No). When there is a reception (step S901: yes), the short message is received and then stored (step S902).

Meanwhile, in this system, the short message forwarding manner definition information that defines a manner of forwarding the short message is generated (step S903), and the short message forwarding manner definition information generated at step S903 is stored (step S904).

By reading out and referring to the short message forwarding manner definition information stored at step S904, and the short message that was received and stored at step S902 is forwarded in accordance with the defined content in the short message forwarding manner definition information (step S905).

Until the communication is finished (step S906: No), the processes from step S901 to step S905 are repeated. When the process of finishing the communication is performed (step S906: Yes), the proceeding ends.

INDUSTRIAL AVAILABILITY

The present invention is effectively applicable to achievement of a short message service management system, a short message forwarding device, a short message forwarding manner definition information supply device, and a short message forwarding method, thereby enabling a short message to be transmitted to a terminal device designated by a transmitting side as a destination from among multiple terminal devices used by an identical user on the receiving side to be forwarded to and received by a predetermined another terminal device that has been designated as a destination beforehand.

EXPLANATION OF REFERENCES

700 short message service management system
710 short message transmission equipment
711 short message forwarding manner definition information supply device
712 short message forwarding manner definition information generating unit
713 short message forwarding manner definition information transmitting unit 720 short message forwarding device
721 short message storing unit
722 short message forwarding manner definition information storing unit
723 short message forwarding unit

The invention claimed is:

1. A short message service management system comprising:
   a short message storing unit for at least temporarily storing a short message to be transmitted from a message originating terminal to a first destination terminal device;
   a short message forwarding manner definition information storing unit for storing short message forwarding manner definition information that defines a first identifier in a first network where the first destination terminal device that is a destination of the short message is located in association with a second identifier in a second network where a second destination terminal device that is a forwarding destination of the short message is located, wherein the short message is forwarded to the second destination terminal device, instead of the first destination terminal device, when the first destination terminal device is not capable of receiving the short message;
   a short message forwarding manner definition information supply unit for generating the short message forwarding manner definition information and supplying the short message forwarding manner definition information to the short message forwarding manner definition information storing unit;
   a terminal location inquiry unit for, when the first destination terminal device is not capable of receiving the short message as indicated by a detection of a reception No Good (NG), generating a terminal location inquiry by referring to the short message forwarding manner definition information stored in the short message forwarding manner definition information storing unit to identify the second destination terminal device as the forwarding destination of the short message and identify the first network as an originating network and the second network as a destination network, and transmitting the terminal location inquiry to the second network; and
   a short message forwarding unit for forwarding the short message stored in the short message storing unit to the second destination terminal device in the second network, upon reception of a response to the terminal location inquiry from the second network.

2. A short message forwarding device comprising:
   a short message storing unit for at least temporarily storing a short message to be transmitted from a message originating terminal to a first destination terminal device;
   a short message forwarding manner definition information storing unit for storing short message forwarding manner definition information that defines a first identifier in a first network where the first destination terminal device that is a destination of the short message is located in association with a second identifier in a second network where a second destination terminal device that is a forwarding destination of the short message is located, wherein the short message is forwarded to the second destination terminal device, instead of the first destination terminal device, when the first destination terminal device is not capable of receiving the short message;
   a terminal location inquiry unit for, when the first destination terminal device is not capable of receiving the short message as indicated by a detection of a reception No Good (NG), generating a terminal location inquiry by referring to the short message forwarding manner definition information stored in the short message forwarding manner definition information storing unit to identify the second destination terminal device as the forwarding destination of the short message and identify the first network as an originating network and the second network as a destination network, and transmitting the terminal location inquiry to the second network; and
   a short message forwarding unit for forwarding the short message stored in the short message storing unit to the second destination terminal device in the second network, upon reception of a response to the terminal location inquiry from the second network.

3. The short message forwarding device according to claim 2, wherein the short message storing unit, the short message forwarding manner definition information storing unit, the terminal location inquiry unit, and the short message forwarding unit are arranged in predetermined short message relay equipment for forwarding the short message in a short message service system, and wherein the predetermined short message relay equipment is arranged between the first network and the second network.

4. A short message forwarding manner definition information supply device that supplies short message forwarding manner definition information to a short message forwarding device,
   the short message forwarding manner definition information supply device comprising:
   a short message forwarding manner definition information generating unit for generating the short message forwarding manner definition information; and
   a short message forwarding manner definition information transmitting unit for transmitting the short message forwarding manner definition information generated by the short message forwarding manner definition information generating unit to the short message forwarding device, and
   the short message forwarding device comprising:
   a short message storing unit for at least temporarily storing a short message to be transmitted from a message originating terminal to a first destination terminal device;
   a short message forwarding manner definition information storing unit for storing short message forwarding manner definition information that defines a first identifier in a first network where the first destination terminal device that is a destination of the short message is located in association with a second identifier in a second network where a second destination terminal device that is a forwarding destination of the short message is located, wherein the short message is forwarded to the second destination terminal device, instead of the first destination terminal device, when the first destination terminal device is not capable of receiving the short message;
   a terminal location inquiry unit for, when the first destination terminal device is not capable of receiving the short message as indicated by a detection of a reception No Good (NG), generating a terminal location inquiry by referring to the short message forwarding manner definition information stored in the short message forwarding manner definition information storing unit to identify the second destination terminal device as the forwarding destination of the short message and identify the first network as an originating network and the second network as a destination network, and transmitting the terminal location inquiry to the second network; and
   a short message forwarding unit for forwarding the short message stored in the short message storing unit to the second destination terminal device in the second network, upon reception of a response to the terminal location inquiry from the second network.

5. The short message forwarding manner definition information supply device according to claim 4, wherein the short message forwarding manner definition information generating unit generates the short message forwarding manner definition information in response to manipulation of a terminal device by a user using a short message service.

6. The short message forwarding manner definition information supply device according to claim 4, wherein the short message forwarding manner definition information generating unit automatically generates the short message forwarding manner definition information based upon a history of the user's use situation of the service.

7. The short message forwarding manner definition information supply device according to claim 4, wherein the short message forwarding manner definition information generating unit automatically generates the short message forwarding manner definition information based upon location information of the terminal device used by the user.

8. A short message forwarding method comprising:

at least temporarily storing a short message to be transmitted from a message originating terminal to a first destination terminal device;

generating short message forwarding manner definition information that defines a first identifier in a first network where the first destination terminal device that is a destination of the short message is located in association with a second identifier in a second network where a second destination terminal device that is a forwarding destination of the short message is located, wherein the short message is forwarded to the second destination terminal device, instead of the first destination terminal device, when the first destination terminal device is not capable of receiving the short message;

at least temporarily storing the short message forwarding manner definition information generated;

when the first destination terminal device is not capable of receiving the short message as indicated by a detection of a reception No Good (NG), generating a terminal location inquiry by referring to the short message forwarding manner definition information stored to identify the second destination terminal device as the forwarding destination of the short message and identify the first network as an originating network and the second network as a destination network;

transmitting the terminal location inquiry to the second network; and forwarding the short message stored to the second destination terminal device in the second network, upon reception of a response to the terminal location inquiry from the second network.

\* \* \* \* \*